April 7, 1925.

J. L. NILSON ET AL 1,532,198

TIRE PUMP

Filed May 2, 1922

INVENTORS:
John L. Nilson John Prince
BY
ATTORNEY

Patented Apr. 7, 1925.

1,532,198

UNITED STATES PATENT OFFICE.

JOHN L. NILSON AND JOHN F. PRINCE, OF CHICAGO, ILLINOIS.

TIRE PUMP.

Application filed May 2, 1922. Serial No. 557,849.

*To all whom it may concern:*

Be it known that we, JOHN L. NILSON and JOHN F. PRINCE, citizens of the United States, residing at Chicago, in the county of Cook and State of Illinois, have invented certain new and useful Improvements in Tire Pumps, of which the following is a specification.

Our invention relates to air pumps and has particular reference to air pumps for inflating pneumatic tires and adapted to be clamped to the running board of an automobile. The objects of our invention are to simplify and reduce the cost of construction; to obviate weak structure features found in pumps of this type heretofore provided; to make more convenient the operative mounting of the pump; to facilitate the removal of the pump cylinder from its base for the purpose of gaining access to and adjusting the piston parts; to eliminate the bulk, weight and weaknesses of the usual cylinder base and its pivotal connections and breaking strains by confining the latter to a single casting or member which includes the cylinder-head, pump and clamp support, and piston-lever bearings, and to utilize one end of the cylinder itself as a base-portion, thereby eliminating the fittings heretofore provided for said end, together with the extra clamp therefor.

And with the above named general objects in view our invention consists in the novel construction, combination and arrangement of parts, hereinafter described in detail, illustrated in the accompanying drawing and more particularly pointed out in the appended claims.

In the drawing—

Figure 1:
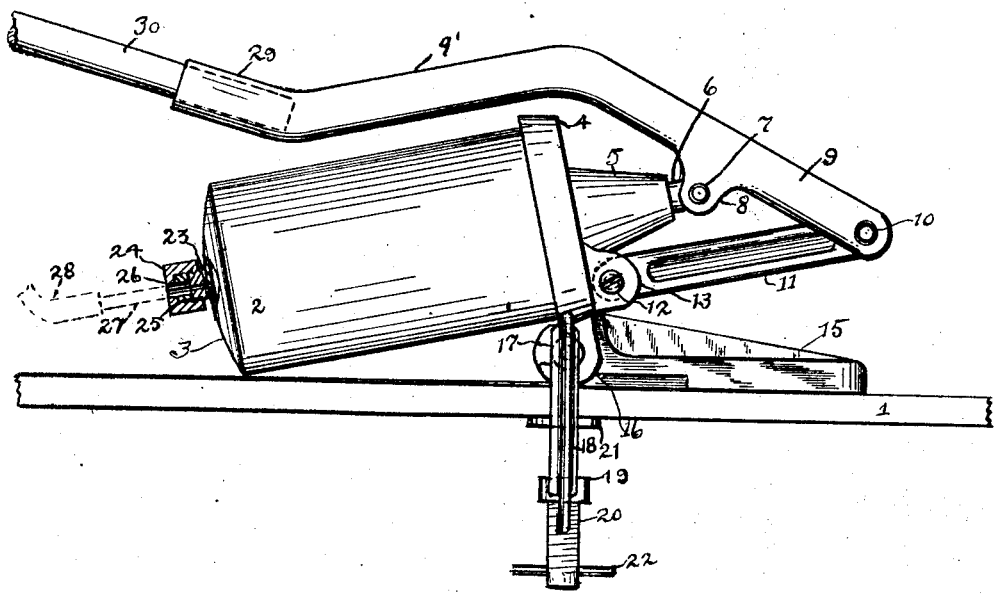
Figure 1 is a side elevation of a pump embodying our invention, clamped to a section of automobile running board, the air-tube nipple connection being shown in section.
Figure 2:
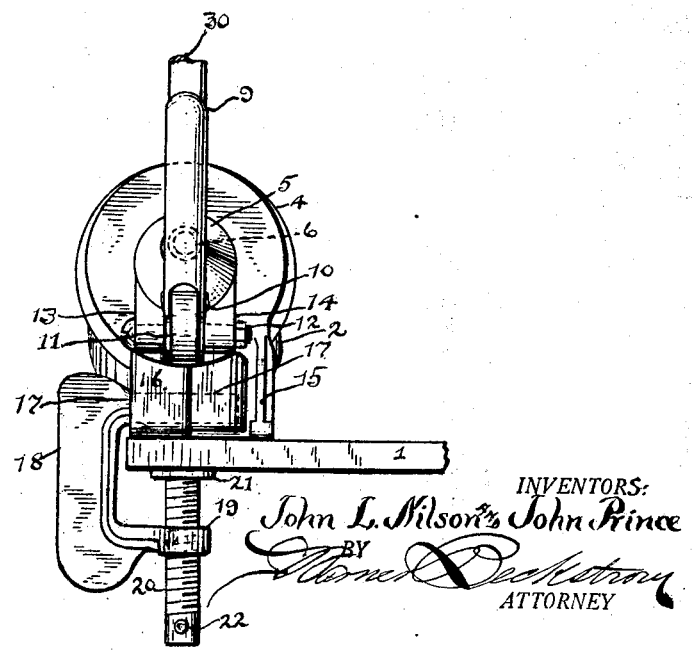
Figure 2 is a rear end view of Figure 1.

In the several views 1 represents the running board and 2 the pump-cylinder which is of the drawn type which provides an integral head 3 which rests directly on the running board as shown eliminating the usual duplicate of the rear head —4— with its base connection and separate clamp. The head 4 is the usual flanged structure and in the present improvement has threaded connection with the cylinder 2, and as the latter is free from base connections or direct connections with the running board 1 it may be easily and quickly removed, by merely unscrewing it from the head 4, when it is necessary to adjust the piston parts, such as spreading the well known cup-leather on the piston which serves both as a part of the piston and an air-inlet valve the details of which are not involved in the present improvement.

The head 4 has as an integral part thereof a rearwardly projecting bearing hub or boss 5 in which the usual piston-rod 6 is slidingly mounted and pivoted at 7 between a pair of bosses 8 projecting from the edges of a usual light or channel bar lever 9 with a portion 9′ bent to lie parallel with the cylinder 2 in its position shown in Figure 1. Said lever 9 and 9′ is pivoted at 10 to one end of a link 11 the opposite end of which is pivoted on a pivot 12 between lugs 13 and 14 which are integral parts of the head 4 whereby a firm and stable support is given the pivot 12 and the link, obviating oscillating movement of the cylinder during operation and obviating the bending strains, which have heretofore caused many breakages, by transmitting the strains from the load end at 10 of the lever longitudinally of the link 11 and directly against the face of the head 4. The swinging movement of the cylinder in other constructions is in the present construction taken up by the link 11 and always receives the pumping strains longitudinally and thrusts them substantially squarely against the piston head 4. Hence there are no strains tending to break the lugs 13 and 14 or any parts between the equivalent of the pivot 12 and the body of the pump or its base. In the present instance a substitute for the usual base is provided by a rearwardly projecting foot or base-portion 15, which is also an integral part of the head 4, and would be substantially so even if said foot or base 15 were a separate member attached in any preferred manner to the head 4, since it will be seen that said part 15 is not burdened to any appreciable extent by operating strains, being merely the support through an integral lug portion 16 of hook form which forms a bearing for the upper leg, or bearing portion, or lug, 17 of a clamp 18 of well known form, the lower bearing portion of which is in the form of the usual nut 19 with which the clamp-screw—20 with the disk 21 swiveled thereon, has threaded engagement. The screw 20 is provided with the usual crossbar or pin 22 by means of which it is turned to tighten the disk 21 against the bottom of the running board and the foot 15 against the top thereof. The rearward, or air-intake stroke of the piston, or piston-rod 6, or lever 9, meets with comparatively small resistance, and the foot 15 and its bearing lug 16 are greatly relieved from said air-intake strains by the fact that the forward thrust of the link 11 tends to prevent the forward end of the cylinder 2 from tilting upwardly. On the forward, or compression, or air-expulsion stroke, the strain of operation tends to tilt the cylinder's forward end downwardly, or to impinge against the running-board, and any tendency, over and above the action and reaction at the pivots 7 and 12 respectively, to cause the cylinder and its foot 17 to slide forward on the forward stroke will tend to tighten the clamp engagement by the lug 16 tending to move in advance of the disk 21 and causing said parts 16 and 21 to bind against the board 1.

The integral head portion 3 of the cylinder is provided with a threaded nipple 23, which in the present improvement is equipped with a cap 24 and a bushing of elastic material, such as rubber, 25 which is compressed by a flange 26 on the cap against the end of the nipple 24 and against the sides of the well known air-hose nipple 27 and its air tube 28 both shown by dotted lines, said cap having, as shown, threaded connection with the nipple 23. The cylinder head 4 is thus provided with a conveniently detachable air-tight connection between the nipples 23 and 27.

The lever portion 9' terminates in a usual angle socket 28 to be loosely engaged by a wooden handle 30 which is shown partly broken away and which may be removed in the interest of compactness when the pump is to be placed in its packing case or the tool box of an automobile.

Aside from the reduction in the usual number of parts, the savings in material and labor, and the improved action pointed out in the foregoing, the entire freedom of the cylinder, other than its threaded engagement with the head 4, is of particular importance in pumps of this type where the cylinder must quite frequently be detached so as to gain access to its interior for the purpose of adjusting the flexible closure between the rigid part of the piston and the inner walls of the cylinder. The substantially direct pull and push action at the points 7 and 12 between the lever and the single-piece member 4, 5, 13, 14 and 15, eliminates the breakages that have heretofore occurred in less direct lever connections with the cylinder, or its head or heads.

We claim as our invention—

1. In a running-board air pump, the combination with the pump cylinder and running-board, of a removable closure for the rear end of the cylinder, said closure being provided with a foot portion adapted to be secured to the running board and alone arranged to support said pump on said running-board, and fulcrum bearing portions on said support with which the piston-operated lever of said pump is pivotally connected.

2. The combination with an air-pump cylinder and a running-board on which said air-pump is mounted, of means for supporting said cylinder at its rear end only, said means forming part of a cylinder-head linked to the fulcrum portions of the piston-operated lever for said pump.

3. The combination with an air-pump having a cup-shaped cylinder the closed end of which is adapted to rest directly upon a running-board, of a cylinder-head removably closing the open end of said cylinder and provided with a foot or base portion that extends rearwardly from said head and away from said cylinder, a rearwardly extending slide-bearing on said head for the piston-rod of the pump, and connections between the pump-lever and the piston-rod and between said lever and said piston-head which transmits the strains of action and reaction in reciprocating the piston, to said cylinder-head.

4. The combination with an air-pump comprising a cylinder integrally closed at one end, of a head closing the opposite end, and a foot forming a rigid portion of said head which extends from the latter oppositely to the extension of said cylinder and provided with means for securing it to a board.

5. The combination with a running-board and an air-pump cylinder closed at one end and having a removable cylinder-head at the opposite end, of an air-outlet nipple on said closed end, means for removably clamping an air-tube nipple to said outlet-nipple, means on said cylinder-head only for securing said pump to the running-board and for connecting the pump-operating lever-bearings with said head.

6. The combination with an air-pump adapted to be clamped to a board and including a cylinder closed at one end adapted to contain a reciprocating piston, of means for closing the rear end of the cylinder and for securing it to the running-board to support the entire pump thereon, lever bearing connections and a clamp, all confined to said rear end leaving the body of said cylinder free of other connections or fittings between it and said board.

In testimony whereof we have hereunto signed our names.

JOHN L. NILSON.
JOHN F. PRINCE.